US010723189B2

(12) United States Patent
Tang et al.

(10) Patent No.: US 10,723,189 B2
(45) Date of Patent: Jul. 28, 2020

(54) PERSONAL TRANSPORTATION DEVICES HAVING A DRIVING CONFIGURATION AND A FLYING CONFIGURATION

(71) Applicant: Ford Global Technologies LLC, Dearborn, MI (US)

(72) Inventors: Daniel Tang, Nanjing (CN); Chelsia Ka Po Lau, Ann Arbor, MI (US); James Yu-Hsin Kuo, Farmington Hills, MI (US); Eui Shik Bang, Nanjing (CN); Jack Li, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 462 days.

(21) Appl. No.: 15/657,567

(22) Filed: Jul. 24, 2017

(65) Prior Publication Data
US 2018/0029431 A1 Feb. 1, 2018

(30) Foreign Application Priority Data
Jul. 26, 2016 (CN) .......................... 2016 1 0596933

(51) Int. Cl.
*B60F 5/02* (2006.01)
*B62K 5/01* (2013.01)
(Continued)

(52) U.S. Cl.
CPC ................ *B60F 5/02* (2013.01); *B60B 19/00* (2013.01); *B60B 19/02* (2013.01); *B62K 5/01* (2013.01);
(Continued)

(58) Field of Classification Search
CPC . B64C 37/00; B64C 39/024; B64C 2201/027; B64C 2201/12;
(Continued)

(56) References Cited

U.S. PATENT DOCUMENTS

| 7,959,104 B2 * | 6/2011 | Kuntz | .................. A63H 17/00 244/2 |
| 8,991,740 B2 * | 3/2015 | Olm | ...................... B64C 25/36 244/2 |

(Continued)

FOREIGN PATENT DOCUMENTS

| CN | 204936724 U | 1/2016 |
| CN | 204936724 U | 6/2016 |

OTHER PUBLICATIONS

Hozuki Ferrari (Signal Academy Neo Information—RPoL).
(Continued)

*Primary Examiner* — Philip J Bonzell
*Assistant Examiner* — Tye William Abell
(74) *Attorney, Agent, or Firm* — Brandon Hicks; Kolitch Romano LLP

(57) ABSTRACT

A personal transportation device comprises a frame, a wheel pivotably connected to a frame and switchable between a driving configuration and a flying configuration, a motor to rotate the wheel; and an automatic cruise module. The automatic cruise module is configured to control the wheel and guide the personal transportation device to fly from a first location to a second location according to a designated route as an unmanned aircraft.

18 Claims, 4 Drawing Sheets

(51) Int. Cl.
*B62K 15/00* (2006.01)
*B64C 39/02* (2006.01)
*G01C 21/34* (2006.01)
*B60B 19/02* (2006.01)
*B60B 19/00* (2006.01)
*B64C 37/00* (2006.01)
*G01C 21/20* (2006.01)
*G05D 1/02* (2020.01)
*B62K 3/00* (2006.01)

(52) U.S. Cl.
CPC ............ *B62K 15/006* (2013.01); *B64C 37/00* (2013.01); *B64C 39/024* (2013.01); *G01C 21/20* (2013.01); *G01C 21/3423* (2013.01); *G05D 1/0202* (2013.01); *B62K 3/002* (2013.01); *B62K 2202/00* (2013.01); *B62K 2204/00* (2013.01); *B64C 2201/027* (2013.01); *B64C 2201/108* (2013.01); *B64C 2201/12* (2013.01); *B64C 2201/141* (2013.01)

(58) Field of Classification Search
CPC ........ B64C 2201/108; B64C 2201/141; B62K 5/01; B62K 15/006; B60F 5/02
See application file for complete search history.

(56) References Cited

U.S. PATENT DOCUMENTS

| | | | |
|---|---|---|---|
| 9,045,226 | B2 | 6/2015 | Piasecki et al. |
| 9,533,729 | B1* | 1/2017 | Chan .................... B62K 15/008 |
| 2016/0311282 | A1* | 10/2016 | Nam ....................... B64C 37/00 |
| 2018/0246529 | A1* | 8/2018 | Hu .......................... B64C 39/024 |

OTHER PUBLICATIONS

B-Unstoppable is a Hybrid Tank Quadcopter Than Can Fly and Also Move on Land; Muhammed Arif; May 27, 2015; https://progeekers.com/.

Peeking Into Our Future—The Black Knight Transformer Multirotor Manned Vehicle; Feb. 3, 2014; http://www.personal-drones.net/peeking-into-our-future-the-black-knight-transformer-multirotor-rnanned-vehicle/.

B-Unstoppable is a Hybrid Tank Quadcopter Than Can Fly and Also Move on Land; Muhammad Arif; May 27, 2015; http://wonderfulengineering.com/b-unstoppable-is-a-hybrid-tank-quadcopter-that-can-fly-and-also-move-on-land/.

* cited by examiner

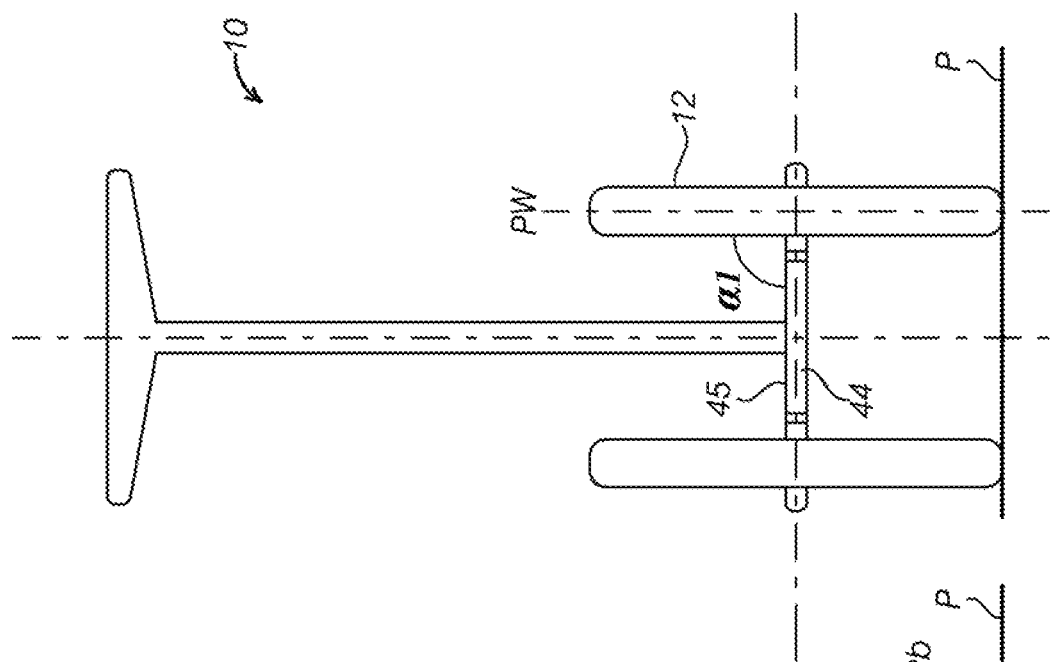
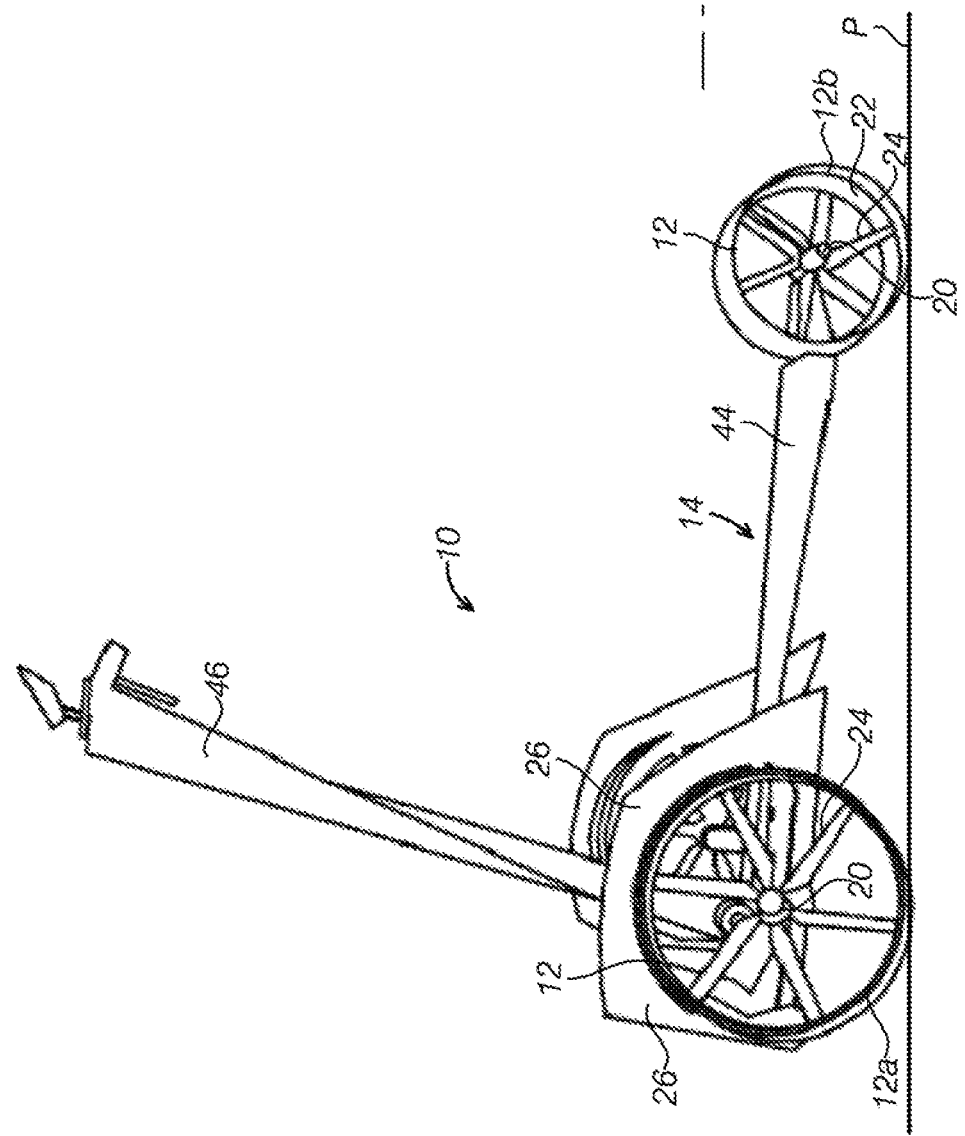
FIG. 1A
FIG. 1B

PERSONAL TRANSPORTATION DEVICES HAVING A DRIVING CONFIGURATION AND A FLYING CONFIGURATION

RELATED APPLICATION

This application claims the benefit of Chinese Patent Application No.: CN 201610596933.0 filed on Jul. 26, 2016, the entire contents thereof being incorporated herein by reference.

FIELD

This invention relates to a personal transportation device, particularly relates a personal transportation device having a driving configuration and a flying configuration and a traveling system including such personal transportation device.

BACKGROUND

People usually travel via a personal vehicle, public transportation systems such as a bus, a train, or an underground transportation system. People choosing public transportation systems often face a problem of a long-distance walk from a departure location to a public transportation station, and/or from the public transportation station to a destination. Under this situation, some people may choose to ride a bike and carry the bike to the public transportation system.

The conventional personal transportation devices include one or more driving wheels such as a bicycle, a tricycle or a balanced unicycle. However, these personal transportation devices travel on the ground via wheels and cannot meet the needs for different driving environments. Further, they are not convenient to be carried by the users.

SUMMARY

To address the issues in the conventional technologies, the present disclosure provides a personal transportation system capable of switching between a driving configuration and a flying configuration and a traveling system including such personal transportation system.

According to one aspect, a personal transportation device comprises a frame, a wheel pivotably connected to a frame and switchable between a driving configuration and a flying configuration, a motor to power the propeller to rotate; and an automatic cruise module. The wheel constitutes a propeller at the flying configuration. The automatic cruise module is configured to control the propeller and guide the personal transportation device to fly from a first location to a second location according to a designated route.

In one embodiment, the automatic cruise module may include a navigation module configured to positioning the designated route between the first location and the second location; and a route calibration module configured to control the propeller to adjust a flying route to be consistent with the designated route.

In another embodiment, the wheel contacts a ground at the driving configuration and the wheel is taken off the ground at the flying configuration.

In another embodiment, the wheel may include a lock mechanism to lock the wheel with the frame at the flying configuration or the driving configuration.

In another embodiment, the wheel may include an axle, a rim and a plurality of spokes connected with the axle and the rim. The spokes constitute blades of the propeller and each blade is rotatable around its blade axis. The automatic cruise module is configured to adjust angles of the blades.

In another embodiment, the axle may include a first axle segment connected to the frame and a second axle segment connected to the rim and pivotably connected to the first axle segment.

In another embodiment, the personal transportation device further comprises a protection member pivotably connected to the frame. The protection member partially surrounds the wheel at the driving configuration, and the surrounds an entire circumference of the wheel at the flying configuration.

In another embodiment, the personal transportation device is a scooter. The wheels include a front wheel and a rear wheel, and the frame includes a deck connected to the front wheel and the rear wheel, and a handle bar pivotably connected to the deck.

In another embodiment, the wheel includes two front wheels and two rear wheels that are disposed at two sides of the frame along a longitudinal direction.

According to another aspect, a personal transportation device comprises a frame, a wheel pivotably coupled to the main base of the frame and switchable between a driving configuration and a flying configuration, a motor to drive the wheel at a flying process; and an automatic cruise module configured to control the personal transportation device to fly from a first location to a second location according to a designated route as an unmanned aircraft. The frame has a main base having a main surface and a plane of the wheel is substantially perpendicular the main surface of the main base at the driving configuration and the plane of the wheel has an acute angel to the main surface of the main base at the flying configuration.

In one embodiment, the acute angle between the plane of the wheel and the main surface is about zero degree at the flying configuration.

In another embodiment, the wheel may include an axel and a plurality of blades. The axel includes a first axel segment connected to the frame and a second axel segment connected to the blades and pivotably connected to the first segment such that the wheel is capable of being arranged to be at the driving configuration and the flying configuration.

In another embodiment, the wheel may include an axel, a rim and a plurality of blade. A first end and a second end of each blade are connected to the rim and axel, respectively and each blade is rotatable along a blade axis passing the first end and the second end. The motor is configured to rotate the axel and the plurality of blades along their blade axis, respectively.

In another embodiment, the automatic cruise module may be configured to control an angle and a speed of the blades such that the personal transportation device flies following the designated route during the flying process.

In another embodiment, the personal transportation device may further include an input unit communicated with the automatic cruise module to input the first location and the second location.

In another embodiment, the automatic cruise module may be configured to be communicated a traffic information database via a network to obtain an optimized route between the first location and the second location.

According to another aspect, a traffic system comprising a personal transportation device and an input unit is provided. The personal transportation device includes a frame having main base, a wheel switchable from a driving configuration to a flying configuration, a motor to rotate the plurality of the blades during a flying process, and an automatic cruise module configured to control the plurality of blades and guide the personal transportation device to fly from a first location to a second location according to a designated route and obtain an optimized route from a traffic information database. The wheel includes a plurality of blades and is pivotably coupled to the main base of the frame, and wherein a plane of the wheel has a first angle to a main surface at the driving configuration and a second angle to the main surface at the flying configuration. The input unit is configured to enter the first location and a second location and send the information to the automatic cruise module.

In one embodiment, the input unit may be included in a handheld mobile device.

In another embodiment, the input unit may be incorporated on the frame.

In another embodiment, the plane of wheel is substantially perpendicular to the main surface of the main base at the driving configuration and is substantially parallel to the main surface of the main base at the flying configuration.

The wheels of the personal transportation device of the present invention are configured as propellers to turn the personal transportation device into an aircraft at a flying configuration, and the wheels are configured as a traveling wheels at driving configuration. Thus, the personal transportation device not only can travel on the ground such as on the roads but also function as a small aircraft to fly at some circumstances. In addition, an automatic cruise module of the personal transportation deice can guide the personal transportation device to fly to a designated location at the flying configuration. The personal transportation device can save a public transportation resource because there is no need to carry the personal transportation device to the public transportation system as the personal transportation device can fly to the designated location automatically.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 1A is a perspective view of a personal transportation device according to one embodiment of the present disclosure, illustrating the personal transportation device at a driving configuration.

FIG. 1B is a front view of the personal transportation device in FIG. 1

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed personal transportation devices and travelling systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various personal transportation devices and travelling systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 2:
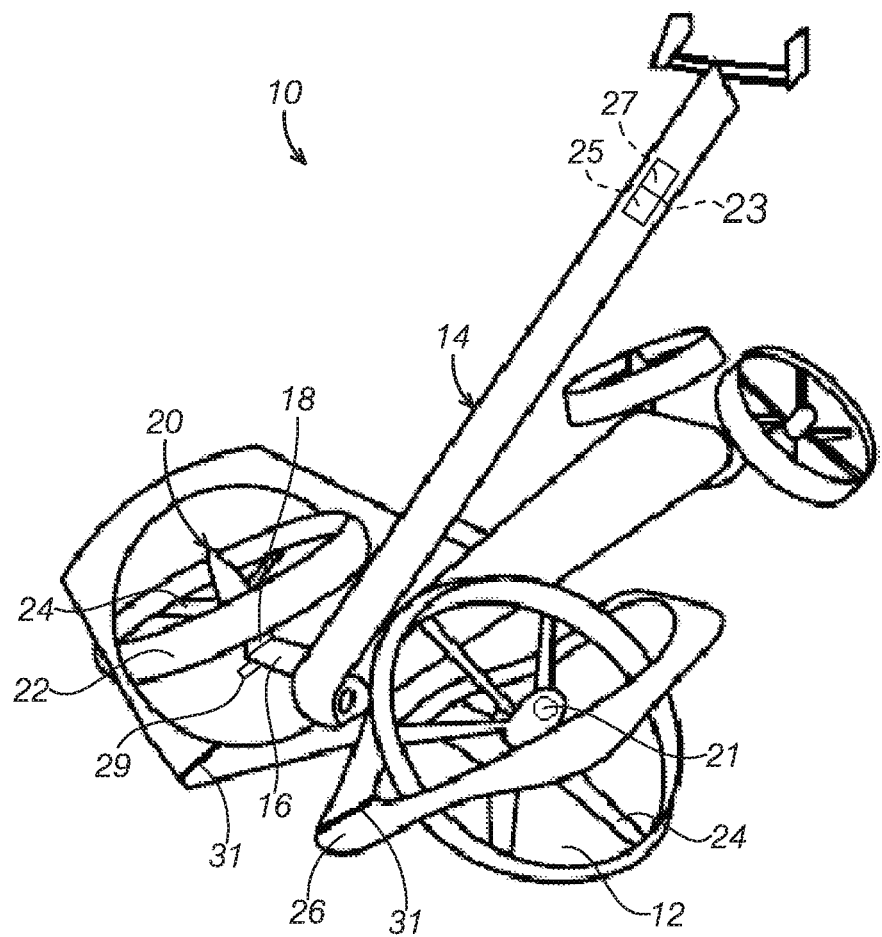
FIG. 2 is a schematic view of the personal transportation device in FIG. 1, illustrating a process where the personal transportation device is changing from a driving configuration to a flying configuration.
Figure 3A:
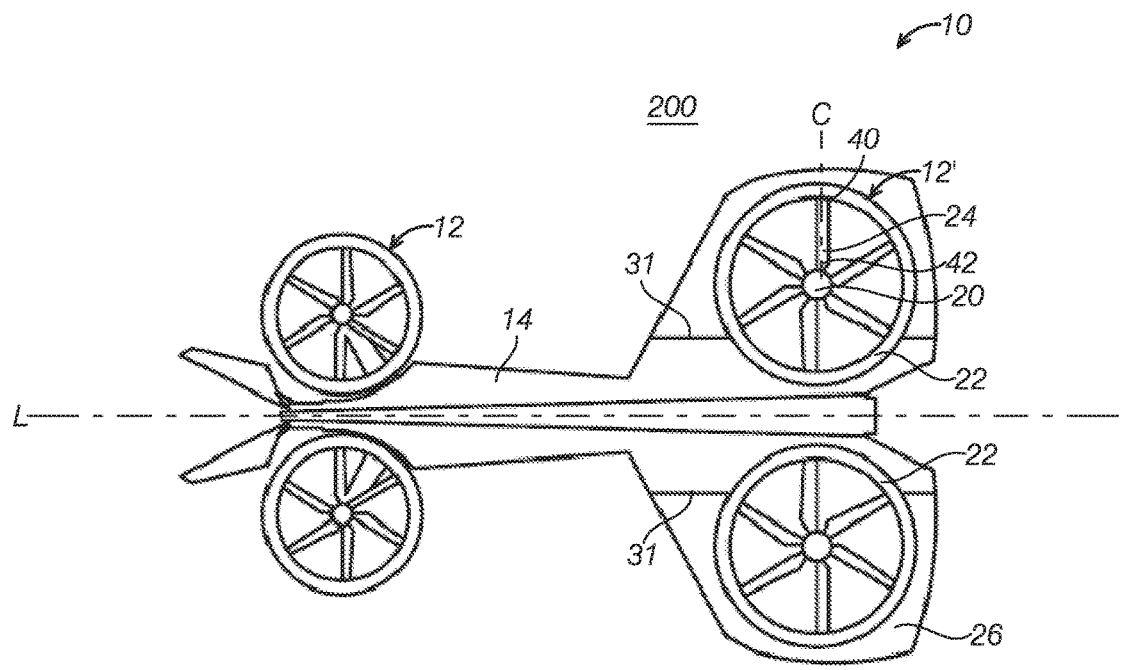
FIG. 3A is a top view of the personal transportation device in FIG. 1, illustrating the personal transportation device at a flying configuration.
Figure 3B:
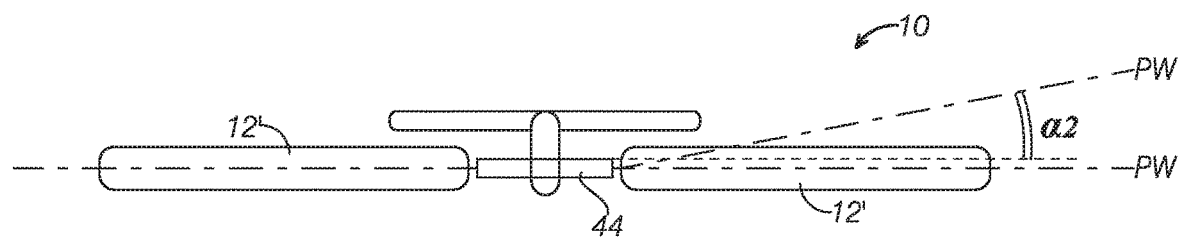
FIG. 3B is a front view of the personal transportation device in FIG. 3A.

Referring FIGS. 1A to 3B, a personal transportation device 10 according to one or more embodiments of the present disclosure is illustrated. FIGS. 1A-1B show the personal transportation device 10 at a driving configuration and FIGS. 3A-3B show the personal transportation device 10 at a flying configuration. FIG. 2 illustrates the personal transportation device 10 in a process to be changed from a driving configuration to a flying configuration. The personal transportation device 10 is illustrated as a scooter in FIGS. 1A-3B. It should be appreciated that the personal transportation device may include other devices having wheels such as a bicycle, a tricycle, and a unicycle. The personal transportation device 10 includes a wheel 12, an electric motor 21 to power the wheels, and an automatic cruise module 23 to control the traveling of the personal transportation device 10 in the air. The wheel 12 is pivotable relative to a frame 14 of the personal transportation device 10 such that the personal transportation device 10 can be switched between a driving configuration 100 as shown in FIGS. 1A-1B and a flying configuration 200 as shown in FIGS. 3A-3B. The wheel 12 constitutes a propeller 12' at the flying configuration 200.

The motor 21 powers the propeller 12' to rotate. The motor 21 is shown to be attached to one wheel in FIG. 2. It should be appreciated that the motor 21 may be attached to every wheel of the personal transportation device 10 or selected wheels depending on the different configurations.

Referring to FIGS. 1A-3B, the wheel 12 is pivotably connected to a frame 14 such that the wheel 12 can be arranged as the driving configuration 100 as shown in FIGS.

1A-1B and as the flying configuration 200 as shown in FIGS. 3A-3B. The frame 14 may include a main base 44 having main surface 45 and being coupled to the wheel 12. A plane PW of the wheel 12 may have a first angle α1 to the main surface 45 at the driving configuration 100 and a second angle α2 to the main surface 45 at the flying configuration 200. The plane PW of the wheel 12 refers to a plane PW including a rim 22 of the wheel 12 or a main plane of the wheel 12. In some embodiments, the plane PW of the wheel 12 may be substantially perpendicular to the main surface 45 of the main base 44 or substantially perpendicular to a ground at the driving configuration 100 (i.e., α1 is about 90 degree) as depicted in FIG. 1B. In some embodiments, the plane PW of the wheel 12 may have an acute angel α2 to the main surface 45 of the main base at the flying configuration 200. In some embodiments, the plane WP of the wheels 12 may be about zero degree to the main surface 45 or substantially parallel to the main surface 45 at the flying configuration 200 as depicted in FIG. 3B.

The automatic cruise module 23 is configured to control the propeller 12' (i.e., wheel such that the personal transportation device 10 flies from a first location to a second location according to a designated route automatically. The automatic cruise module 23 may be a processor communicated with the motor 21 and other units as described herein thereafter. The automatic cruse module 23 may be integrated on the frame 14 of the personal transportation device 10.

It should be understood that the driving configuration 100 refers to a configuration where a personal transportation device 10 drives on the ground such as on a city street or a highway, while the flying configuration 200 refers to a configuration where the personal transportation device 10 is configured as a small aircraft having a propeller to fly without carrying a person. In other words, the wheel 12 is configured as driving wheel of the personal transportation device 10 on the ground at a normal use condition (i.e., the driving configuration 100 of the personal transportation device 10). At the flying configuration, one or more wheels 12 are configured as propellers of the personal transportation device 10 for flying. In addition, it should be understood that the positions of the motor 21 and the automatic cruise module 23 are only schematically illustrated in the embodiment as shown in FIG. 2. In other embodiments, the motor 21 and the automatic cruise module 23 may be configured at any suitable positions on the personal transportation device 10. Moreover, the motor 21 and the automatic cruise module 23 may be a built-in component. Alternatively, the motor 21 and the automatic cruise module 23 may be separate components attached to the personal transportation device 10.

In the embodiment described above, the wheel 12 may be configured as a propeller 12' to turn the personal transportation device 10 into an aircraft in the flying configuration 200 and configured as a wheel in the driving configuration 100. As such, the personal transportation device 10 not only goes on streets, but also travels as an unmanned aerial vehicle. Furthermore, the automatic cruise module 23 may guide the personal transportation device 10 to fly form one place to another place according to a designated route.

The personal transportation device 10 can utilize an air space without interfering the ground traffic and it is easy to be sent from one location to another location autonomously. Comparing with conventional manned aircrafts, the personal transportation device 10 is cost effective, and it is easy to launch and land in a small area.

Figure 4:
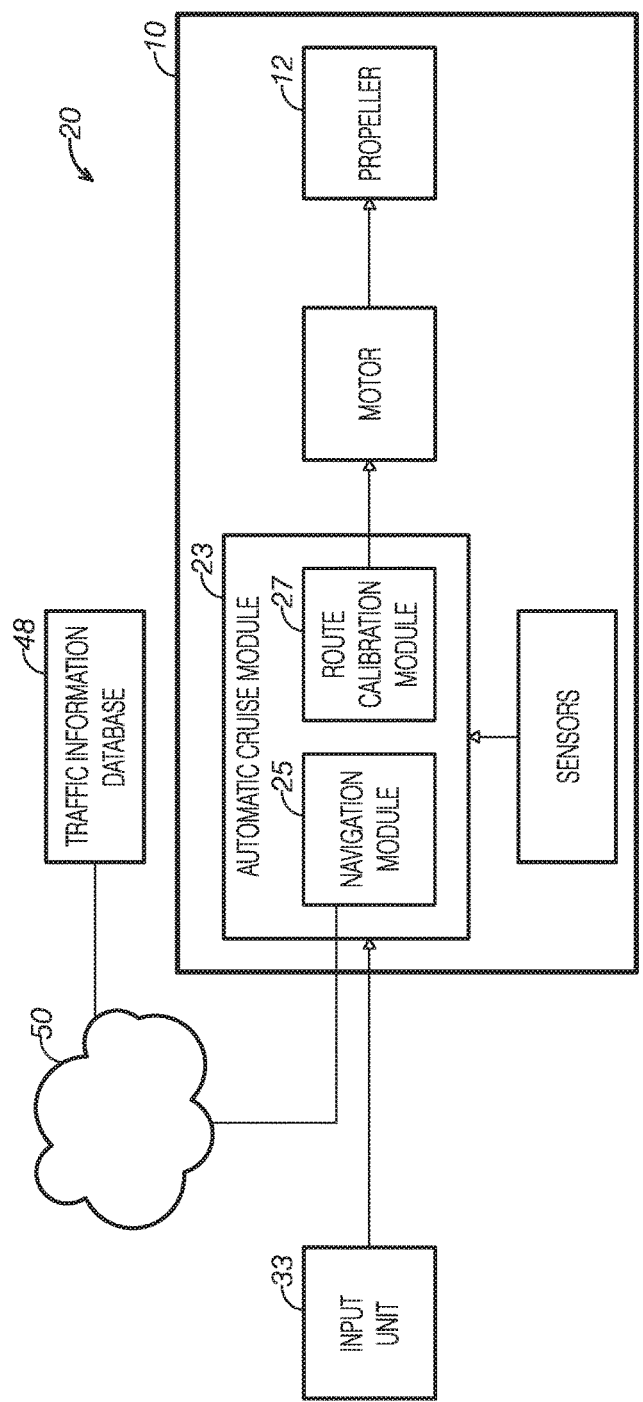
FIG. 4 is an example traveling system including a personal translation device according to one embodiment of the present disclosure.

In some embodiments, the flying of the personal transportation device 10 may be autonomous. Referring to FIG. 4 and with further reference to FIGS. 1A-3B, a traveling system 20 including the personal transportation device 10 is illustrated. The traveling system 20 includes a personal transportation device 10 and an input unit 33. The personal transportation device 10 may comprise an automatic cruise module 23 including a navigation module 25 and a route calibration module 27. In some embodiments, the input unit 33 may be incorporated into the personal transportation device 10 to allow a user to set up a flying journey by entering a starting location and a destination. In some embodiments, the input unit 33 may be included in a handheld mobile device (e.g., a cell phone, a laptop, or a multifunctional watch). The user can remotely operate the personal transportation device 10 with the handheld mobile device. For example, at the starting position, a destination and an arriving time can be set up in the handheld mobile device. In another embodiment, the input unit 33 can be disposed in a remote control set of the personal transportation device.

The automatic cruise module 23 is configured to set up the flying route and control the propeller 12' of the personal transportation device 10 to follow the designated route during the flying process. The automatic cruise module 23 of the personal transportation device 10 may include a navigation module 25 configured to positioning the designated route between a first location and a second location; and a route calibration module 27 configured to control the propeller 12' to adjust an actual flying route to be consistent with the designated route. When a user is at the first location and set up the second location via the input unit 33, the navigation module 25 sets up a designated route between the first location and the second location for an automatic flying. The route calibration module 27 adjusts or calibrates the actual flying route to avoid deviation from the designated route and ensure arrival at the second location correctly. The 21 may receive instructions from the route calibration module 27 to rotate the blades of the propeller 12' at a certain speed and/or turn to a certain angle. The route calibration module 27 may include modules or components conventionally used or later developed to calibration the traveling route. The personal transportation device 10 may further include sensors 35 to detect surrounding objects (e.g., buildings, birds, trees, power line, even other similar flying objects) and send the detected information to the automatic cruise module 23 so that the automatic cruise module 23 may change the route to prevent potential collision with the objects. In addition, the personal transportation device 10 may include a route adjustment module to adjust the route of the personal transportation device 10 in real time based on the feedback information from an outside database such as a traffic information database 48 and transmit the updated information to the navigation unit 25 or the automatic cruise module 23.

In some embodiments, the travelling system 20 may include a traffic information database 48 and the personal transportation device may be communicated to the traffic information database 48 via a network 50. The automatic cruise module 23 may transmit the position information of the personal transportation device 10 and receive the feedback from the traffic information database 48 and adjust the route to the destination accordingly. In some embodiments, the traffic information database 48 may provide the optimized course based on the weather conditions, building distribution, information on the restricted flying space between the first location and the second location and the automatic cruise module 23 may select the optimized course as a designated route or adjust the flying route.

Turning to FIGS. 1A-1B and 3A-3B, at the driving configuration 100, the wheel 12 contacts a plane P or a ground on which the personal transportation device 10 is located. At the flying configuration 200, the wheel departs from the ground on which the personal transportation device 10 is located. It should be noted that the plane on which the wheel 12 and the personal transportation device 10 are located refers to the plane on which the wheel 12 contacts while the personal transportation device 10 travels under a normal traveling process, such as, the personal transportation driving on the streets or the highway. In other words, the driving configuration 100 is a normal traveling configuration for the personal transportation device 10, while the flying configuration 200 refers to the flying configuration that the personal transportation device 10 can takes off from the ground and travels as an unmanned aircraft.

In some embodiments, each wheel 12 may include a lock mechanism 29 to lock the wheel 12 at the flying configuration 200 or the driving configuration 100 as shown in FIG. 2. When the wheel 12 is switched to a flying configuration 200 or driving configuration 100, the lock mechanism 29 can secure the wheel 12 at a designed position for the flying configuration 200 or the driving configuration 100 to prevent the wheel dislocated or shaking during flying or traveling on the ground. In some embodiments, the lock mechanism 29 may include but not limited to a lock/latch structure, a clip/slot structure, a pin/pin hole structure used for locking. It should be understood that the position of the lock mechanism 29 in the embodiment as shown in FIG. 2 is schematically illustrated. The lock mechanism 29 may be deposed on any suitable positions. Further, the lock mechanism may be activated to lock and unlock via a button. For example, a user may press the button to lock the wheel when the personal transportation device 10 is set up for a configuration of the flying configuration or the configuration of the driving configuration.

Referring to FIG. 1A to FIG. 3B, the wheel 12 includes an axle 20, a rim 22 and a plurality of spokes 24 connected between the axle 20 and the rim 22. The spokes 24 constitute the blades of a propeller and are rotatable around a blade axis C of the blades at the flying configuration 200 as shown in FIGS. 3A-3B. At the driving configuration 100, an outer surface of the rim 22 contacts a surface or a ground on which the personal transportation device 10 travels. In some embodiments, the outer surface of the rim 22 may include a tire. In other words, the rim 22 is configured to be a support member around a circumference of the wheel 12 to support the tire. At the driving configuration 100, the axel 20 is a rotation shaft for the wheel 12, and the rim 20 and the spokes 24 rotate around the axel 20 to move the personal transportation device 10 to a desired direction.

At the flying configuration 200, the motor 21 drives the wheel 12 to rotate via the axel 20 as a propeller to power the personal transportation 10 to fly. During flying, the automatic cruise module 23 is configured to adjust angle and speed of the blades to adjust the flying status. When the spokes 24 constitutes the blades 24' of the propeller, the blade 24' is rotatable around a blade axis C. The direction of the blade axis C is a radial direction from the axel 20 outward to the rim 22 In some embodiments, the blade 24' may include a first end 40 rotatable connected with the rim 22 and a second end 42 rotatably connected to the axel 20 so that the blade 24' is rotatable around the blade axis C passing the first end 42 and the second end 44. When the angle of the spoke 24 (or blade 24') is changed, the flying status such as a flying altitude, a posture, and a direction of the personal transportation device 10 will be adjusted to direct the personal transportation device 10 to fly at a designated route. In addition, it should be understood that the spoke 24 (blade 24') are rotated around its own blade axis C during the adjustment of the blade angle. Corresponding, during the flying, the spokes 24 (blade 24') may rotate around the axle 20.

In some embodiments, at the driving configuration 100, the motor 21 may be also a power source to rotate the wheel 12 to drive the personal transportation device 10.

In one embodiment, the rim 22 may be detachably connected with the spokes 24 and the spokes 24 may be detachably connected with the axel 20 and thus any of them can be replaced when needed. In other embodiments, to reduce the noises from the wheel 12 during traveling on the ground and the flying and enhance the reliability of the wheel 12, the rim 22 may be connected integrally with the spoke 24 and the spoke 24 may be connected integrally with the axel 20 while the spokes 24 are rotatable relative to the rim and the axel.

Referring to FIG. 2, in some embodiments, the axel 20 may include a first axle segment 16 connected to the frame 14 and a second axle segment 18 connected to the spokes 24 and pivotable relative to the first axle segment 16. The second axel segment 18 includes a driving shaft to rotate the wheel 12 or the propeller via the motor 21. In one embodiment, the motor 21 may be configured in the second axel segment 18. The driving shaft of the motor 21 drives the propeller to rotate directly. In addition, the first axel segment 16 and second axel segment 18 are pivotably connected via any appropriate approaches such as gear engagement, hydraulic driven, or a pneumatic drive. It should be understood that the position of the motor 21 as described above is only one example. In other embodiments, the motor 21 may also be configured in the first axel segment 16, and transmits power to the propeller via any appropriate approaches, such as, gears or chains. In one embodiment, the first axel segment 16 as described above may be configured to be fixed on the frame 14. Thus, the frame 14 will not block the wheel 12 due to a short distance when the wheel 12 switches between the driving configuration 100 and the flying configuration 200.

As shown in FIGS. 1A to 3B, according to one embodiment, the frame 14 includes a protection member 26 pivotable relative to the frame 14. The protection member 26 may partially surround the wheel 12 to protect the wheel 12 and function as a fender at the driving configuration 100 as shown in FIG. 1. The protection frame 26 may surround the entire circumference of the wheel 12 to protect the wheel 12 at the flying configuration 200 as shown in FIG. 3A. As shown in FIGS. 2 and 3A, the protection member 26 is pivoted around a hinge shaft 31 to switch between the driving configuration as shown in FIGS. 1A-1B and the flying configuration as shown in FIGS. 3A-3B.

In the depicted embodiment, the personal transportation device 10 is a scooter. The wheels 12 of the scooter include front wheels 12a and rear wheels 12b, and the main base 44 of the frame 14 may be a deck connected to the front wheels 12a and the rear wheels 12b, and a handle bar 46 is pivotable relative to the deck.

Referring to FIG. 3A-3B, in one embodiment the wheels 12 are disposed at two sides of the frame 14 symmetric to a line L at a longitudinal direction. That is, the wheels are disposed at both two ends of the frame 14 along the longitudinal direction L (for example, the front wheel and the rear wheel along the longitudinal direction L). In the depicted embodiment, the personal transportation device 10 has four wheels 12.

In one embodiment, the wheel 12 may be symmetrically disposed at two ends of the frame 14 along a longitudinal direction L. It should be understood that any other forms of the wheel arrangement suitable for switching between a driving configuration and a flying configuration for a personal transportation device may be used to implement the invention.

Figure 5:
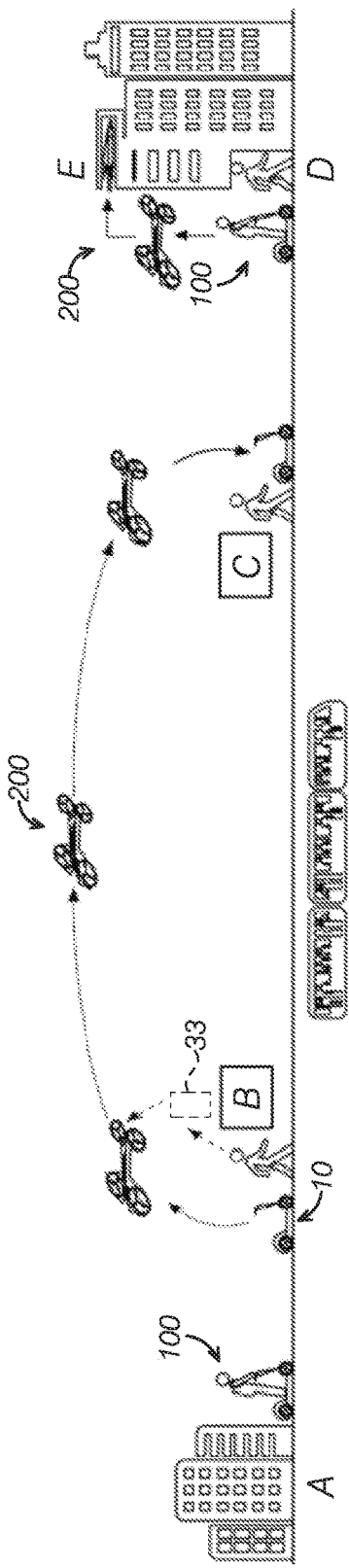
FIG. 5 illustrates an example route of the personal transportation device in a traveling system according to the present disclosure.

FIG. 5 illustrates an example route of the personal transportation device 10 in a traveling system. As shown in FIG. 5, a user drives the personal transportation device 10 from a departure place A (e.g. a home) to a public transportation station B (e.g., a subway station), then takes a public transportation to place C e.g., another subway station) which is closed to a final destination place D.

Before departure from the place B the user inputs information of the place B and the place C via an input unit 33, and the input unit 33 transmits the information on the locations to the automatic cruise module 23 of the personal transportation device 10. In some embodiments, the automatic cruise module 23 may be communicated with a traffic information database via a network or cloud which receives the position information from the automatic cruise module and feedback the information to the automatic cruise module to assist the personal transportation device 10 to follow the designated route. The personal transportation device 10 may be switched from the driving configuration 100 to the flying configuration 200, and flies to the location C as an unmanned aircraft with the control by the automatic cruise module 23. The user may find the personal transportation device 10 at the location C. Then, the user switches the personal transportation device 10 from the flying configuration 200 back to driving configuration 100, so that be or she can ride the personal transportation device 10 at the place C and travel to the final destination D (e.g., the user's work place).

In one example, after the user arrives the final destination D, the user may set up a route to have the personal transportation device fly automatically to a charging station E near the final destination D to charge the motor 21. In another example, the user may set up a route to have the personal transportation device to fly automatically to a parking lot.

The personal transportation device of the present disclosure enables the user to use different transportation vehicles during a trip. As the personal transportation device can fly from one location to another location as an unmanned aircraft, the user can ride the personal transportation device to a public transportation station, then take a bus, a train or subway without the need to carry the personal transportation device with him or her and thus save the resource of the public transportation.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A personal transportation device, comprising:
   a frame;
   a wheel, wherein the wheel is pivotably connected to the frame and switchable between a driving configuration and a flying configuration, and wherein the wheel constitutes a propeller at the flying configuration;
   a protection member pivotably connected to the frame, and wherein the protection member partially surrounds the wheel at the driving configuration, and the protection member surrounds an entire circumference of the wheel at the flying configuration;
   a motor to power the propeller to rotate; and
   an automatic cruise module, wherein the automatic cruise module is configured to control the propeller and guide the personal transportation device to fly from a first location to a second location according to a designated route.

2. The personal transportation device of claim 1, wherein the automatic cruise module includes:
   a navigation module configured to position the designated route between the first location and the second location; and
   a route calibration module configured to control the propeller to adjust a flying route to be consistent with the designated route.

3. The personal transportation device of claim 1, where the wheel contacts a ground at the driving configuration and the wheel is taken off the ground at the flying configuration.

4. The personal transportation device of claim 1, wherein the wheel includes a lock mechanism to lock the wheel with the frame at the flying configuration or the driving configuration.

5. The personal transportation device of claim 1, wherein the personal transportation device is a scooter, wherein the wheel include a front wheel and a rear wheel, wherein the frame includes a deck connected to the front wheel and the rear wheel, and a handle bar pivotably connected to the deck.

6. The personal transportation device of claim 1, wherein the wheel includes two front wheels and two rear wheels that are disposed at two sides of the frame along a longitudinal direction.

7. The personal transportation device of claim 1, wherein the wheel includes an axle, a rim and a plurality of spokes connected with the axle and the rim, wherein the spokes constitute blades of the propeller, each blade rotatable around its blade axis, and wherein the automatic cruise module is configured to adjust angles of the blades.

8. The personal transportation device of claim 7, wherein the axle includes a first axle segment connected to the frame and a second axle segment connected to the rim and pivotably connected to the first axle segment.

9. A personal transportation device, comprising:
   a frame, wherein the frame has a main base having a main surface;
   a wheel, wherein the wheel is pivotably coupled to the main base of the frame and switchable between a driving configuration and a flying configuration, and wherein a plane of the wheel is substantially perpendicular the main surface of the main base at the driving configuration and the plane of the wheel has an acute angle to the main surface of the main base at the flying configuration;

a protection member pivotably connected to the frame, and wherein the protection member partially surrounds the wheel at the driving configuration, and the protection member surrounds an entire circumference of the wheel at the flying configuration;

a motor to drive the wheel at a flying process; and an automatic cruise module configured to control the personal transportation device to fly from a first location to a second location according to a designated route as an unmanned aircraft.

10. The personal transportation device of claim 9, where the acute angle is zero degree to the main surface at the flying configuration.

11. The personal transportation device of claim 9, where the wheel includes an axel and a plurality of blades, wherein the axel includes a first axel segment connected to the frame and a second axel segment connected to the blades, wherein the second axel segment is pivotably connected to the first axel segment such that the wheel is arranged to be at the driving configuration and the flying configuration.

12. The personal transportation device of claim 9, further includes an input unit communicated with the automatic cruise module to input the first location and the second location.

13. The personal transportation device of claim 9, wherein the automatic cruise module is configured to be communicate with a traffic information database via a network to obtain an optimized route between the first location and the second location.

14. The personal transportation device of claim 9, where the wheel includes an axel, a rim and a plurality of blades, where a first end and a second end of each blade are connected to the rim and the axel, respectively and each blade is rotatable along a blade axis passing the first end and the second end, and wherein the motor is configured to rotate the axel and the plurality of blades along their blade axis, respectively.

15. The personal transportation device of claim 14, where the automatic cruise module is configured to control an angle and a speed of the blades such that the personal transportation device flies following the designated route during the flying process.

16. A traffic system, comprising:

a personal transportation device including a frame, wherein the frame includes a main base having a main surface;

a wheel switchable from a driving configuration to a flying configuration, wherein the wheel includes a plurality of blades and is pivotably coupled to the main base of the frame, and wherein a plane of the wheel has a first angle to the main surface of the main base at the driving configuration and a second angle to the main surface of the main base at the flying configuration;

a motor to rotate the plurality of the blades during a flying process; and an automatic cruise module, wherein the automatic cruise module is configured to control the plurality of blades and guide the personal transportation device to fly from a first location to a second location according to a designated route and obtain an optimized route from a traffic information database;

an input unit configured to enter the first location and the second location and send information to the automatic cruise module, wherein the input unit is incorporated on the frame.

17. The traffic system of claim 16, wherein the input unit is included in a handheld mobile device.

18. The traffic system of claim 16, wherein the plane of the wheel is substantially perpendicular to the main surface of the main base at the driving configuration and is substantially parallel to the main surface of the main base at the flying configuration.

\* \* \* \* \*